United States Patent Office 3,650,969
Patented Mar. 21, 1972

3,650,969
COMPOSITIONS FOR REMOVAL OF FINISH COATINGS
Gotlibs Baltakmens, Wilmington, Del., and John P. Tourish, Wallingford, Pa., assignors to Allied Chemical Corporation, New York, N.Y.
No Drawing. Filed July 29, 1968, Ser. No. 748,207
Int. Cl. C11d 7/50
U.S. Cl. 252—143
11 Claims

ABSTRACT OF THE DISCLOSURE

Improved compositions for the removal of finish coatings, such as paint coatings, from substrates comprise a dichloroalkane containing 1 to 2 carbon atoms, such as methylene chloride, an aliphatic monohydric alcohol containing 1 to 3 carbon atoms, such as methanol, hydrogen fluoride, water and preferably iodine.

---

This invention relates to improved compositions for the removal of finish coatings from substrates and to a process for such removal. The compositions may be used to remove finish coatings such as paint, varnish, lacquer, enamel and photoresist coatings from substrates such as metal, wood and ceramics.

Although compositions for the removal of finish coatings from substrates are well-known to those skilled in the art, no ideal stripping solution has been found as yet. Accordingly, there is a distinct need in the art for new and improved stripping compositions, particularly highly efficient compositions which are composed of low cost components.

In general, finish coating removers employ a chlorinated hydrocarbon as the principal solvent for softening and loosening the finish coating in order to permit its removal. The chlorinated hydrocarbons of highest efficiency and lowest cost are the dichloroalkanes containing 1 to 2 carbon atoms, specifically methylene chloride and ethylene dichloride. The preferred dichloroalkane is methylene chloride.

We have now discovered that the stripping ability of finish coating remover compositions in which a dichloroalkane containing 1 to 2 carbon atoms is employed as the principal stripping agent may be substantially improved by the combination of the dichloroalkane with hydrogen fluoride, an aliphatic monohydric alcohol containing 1 to 3 carbon atoms and water. These improved compositions are as follows:

| Component: | Weight percent, about |
| --- | --- |
| Dichloroalkane | 70–90 |
| Aliphatic monohydric alcohol | 5–20 |
| Hydrogen fluoride | 1–4 |
| Water | 1–6 |

Particularly outstanding stripping action is attained by use of the following preferred compositions:

| Component: | Weight percent, about |
| --- | --- |
| Methyl chloride | 85–87 |
| Methanol | 9–11 |
| Hydrogen fluoride | 1–3 |
| Water | 1–3 |

It has been further discovered that the stripping rate of the above compositions may be substantially increased by incorporating in the compositions about 0.05 to 0.2% by weight of iodine, preferably about 0.08 to 0.12% by weight of iodine.

The stripping compositions of this invention are exceptionally effective in removing finish coatings from substrates and have the additional advantageous properties of (1) being composed of components which are low basic chemicals, (2) having low corrosiveness on the substrates, (3) having relatively low toxicity and (4) leaving no residue after stripping.

The hydrogen fluoride component of the present compositions may be added as substantially anhydrous liquid hydrofluoric acid but is preferably added as aqueous hydrofluoric acid. As preferred, the entire required amount of water component may be present in the aqueous hydrofluoric acid.

Any aliphatic monohydric alcohol containing 1 to 3 carbon atoms may be employed in the compositions of this invention. Particularly outstanding results, however, have been attained using inexpensive methanol which is, accordingly, preferred. Other suitable alcohols include, but are not limited to, ethanol and isopropanol.

The aliphatic monohydric alcohol employed in the compositions functions as a cosolvent to permit the hydrogen fluoride to form a homogeneous, clear system with the dichloroalkane. This is essential since hydrogen fluoride is relatively immiscible with dichloroalkanes. The minimum amount of cosolvent required is that necessary to solubilize the hydrogen fluoride. If the amount of hydrogen fluoride is increased, greater quantities of aliphatic monohydric alcohol are required in order to maintain a homogeneous, clear solution.

It was quite surprising that aliphatic monohydric alcohols could be employed as cosolvents for hydrogen fluoride and dichloroalkanes since prior art workers have taught that far more expensive agents must be used to overcome the formation of two phase systems of hydrogen fluoride and chlorinated hydrocarbons. For example, U.S. Pat. 2,737,499 discloses use for that purpose of aliphatic monohydric alcohols, aromatic hydroxy compounds, aliphatic carboxylic acids, aliphatic amines, aliphatic nitriles, aliphatic nitro compounds, aliphatic ketones and aliphatic ethers, all containing 12 to 22 carbon atoms. U.S. Pat. 3,335,088 discloses use for the same purpose of Lewis bases, particularly oxygen-containing organic compounds such as organic ethers, aromatic compounds containing a phenolic hydroxy group and organic nitro compounds.

In addition to the components described above, the finish coating remover compositions may contain certain adjuvants, none of which is required to realize the outstanding stripping action of the compositions but is, in each case, optional. These adjuvants are generally thickeners, such as methyl cellulose and ethyl cellulose, which increase the viscosity of the compositions for certain specialized uses and ingredients which retard the evaporation of the solvents in the compositions, thereby minimizing the loss of the solvents before the stripping operation is complete. A preferred example of the latter type of ingredient is paraffin wax.

The finish coating remover compositions of this invention may be prepared by simply mixing the components in conventional manner employing mild agitation. The compositions are preferably applied to the finish coatings to be removed by dipping the coated substrate into the composition or by sparying or flowing the composition over the finish coating. Room temperature and atmospheric pressure are generally preferred for usual applications.

The contact time is that length of time required to loosen the coating from the substrate and is not particularly critical. Generally, however, the contact time is in the range of about 1 to 15 minutes.

After the coating has been treated for a sufficient length of time to slough off the coating, the substrate should be washed immediately in water or a suitable inert organic solvent.

The process of the present invention is capable of removing from substrates a variety of finish coating materials, especially paint coatings. The paint coatings may, for example, be of the acrylic-, epoxy- or urethane-based type. The process can also be used for removing photoresist coating from silicon wafers in the semi-conductor field, as well as for the removal of coatings in the integrated circuitry and chemical micromilling fields.

In order to demonstrate the effectiveness of the finish coating remover compositions of this invention, compositions were prepared and tested for effectiveness in loosening acrylic-type paint coatings from steel panels and photoresist coatings from silicon wafers. The compositions used in the tests were as follows:

FORMULATION I

| Component: | Weight percent |
|---|---|
| Methylene chloride | 86 |
| Methanol | 10 |
| Hydrogen fluoride | [1] 2 |
| Water | [1] 2 |

FORMULATION II

| Component: | Weight percent |
|---|---|
| Methylene chloride | 86 |
| Methanol | 10 |
| Hydrogen fluoride | [1] 2 |
| Water | [1] 2 |
| Iodine | 0.1 |

FORMULATION III

| Component: | Weight percent |
|---|---|
| Methylene chloride | 87.4 |
| Methanol | 10.0 |
| Hydrogen fluoride | [1] 1.25 |
| Water | [1] 1.25 |
| Iodine | 0.1 |

[1] Added as 50% aqueous hydrofluoric acid.

The tests were carried out by placing the panel or wafer in a container covered with the finish coating remover composition. The time required for the bond between the panel or wafer and the coating to become adequately loosened to permit flushing off the coating with water was noted.

Formulation 1 stripped the finish coatings from the substrates in about 1 to 2 minutes. Formulations 2 and 3 stripped the finish coatings from the substrates in about half the time taken by Formulation 1. After Formulations 2 and 3 were aged for three weeks, no change in stripping rate was found. None of the substrates was appreciably corroded by the stripping solutions.

Although the invention has been described with reference to specific embodiments, these have been presented by way of illustration only and no limitation is thereby implied.

We claim:

1. A composition for the removal of finish coatings from substrates which consists essentially of about 70 to 90% by weight of a dichloroalkane having 1 to 2 carbon atoms, about 5 to 20% by weight of a monohydric hydrocarbon alcohol containing 1 to 3 carbon atoms, about 1 to 4% by weight of hydrogen fluoride and about 1 to 6% by weight of water.

2. A composition according to claim 1 which consists essentially of about 85 to 87% by weight methylene chloride, about 9 to 11% by weight of methanol, about 1 to 3% by weight of hydrogen fluoride and about 1 to 3% by weight of water.

3. A composition according to claim 1 wherein about 0.05 to 0.2% by weight of iodine is incorporated in the composition.

4. A composition according to claim 2 wherein about 0.08 to 0.12% by weight of iodine is incorporated in the composition.

5. The process of removing a finish coating from a substrate which comprises contacting the finish coating with a composition consisting essentially of about 70 to 90% by weight of a dichloroalkane having 1 to 2 carbon atoms, about 5 to 20% by weight of a monohydric hydrocarbon alcohol containing 1 to 3 carbon atoms, about 1 to 4% by weight of hydrogen fluoride and about 1 to 6% by weight of water for a time sufficient to loosen the coating and then removing the loosened coating.

6. A process according to claim 5 wherein the composition consists essentially of about 85 to 87% by we'ght of methylene chloride, about 9 to 11% by weight of methanol, about 1 to 3% by weight of hydrogen fluoride and about 1 to 3% by weight of water.

7. A process according to claim 5 wherein about 0.05 to 0.2% by weight of iodine is incorporated in the composition.

8. A process according to claim 6 wherein about 0.08 to 0.12% by weight of iodine is incorporated in the composition.

9. A process according to claim 6 wherein the finish coating is a paint coating.

10. A process according to claim 7 wherein the finish coating is a paint coating.

11. A process according to claim 8 wherein the finish coating is a paint coating.

References Cited

UNITED STATES PATENTS

| 3,147,224 | 9/1964 | Gaunh, et al. | 252—143 |
| 3,232,881 | 2/1966 | Kapalko et al. | 252—143 |
| 3,335,087 | 8/1967 | Keers, Jr. | 252—143 |

FOREIGN PATENTS

| 734,389 | 5/1966 | Canada | 252—143 |

MAYER WEINBLATT, Primary Examiner

U.S. Cl. X.R.

252—DIG 8, 79.1, 79.3; 134—38